BACK PRESSURE REGULATOR VALVE
ASSEMBLY

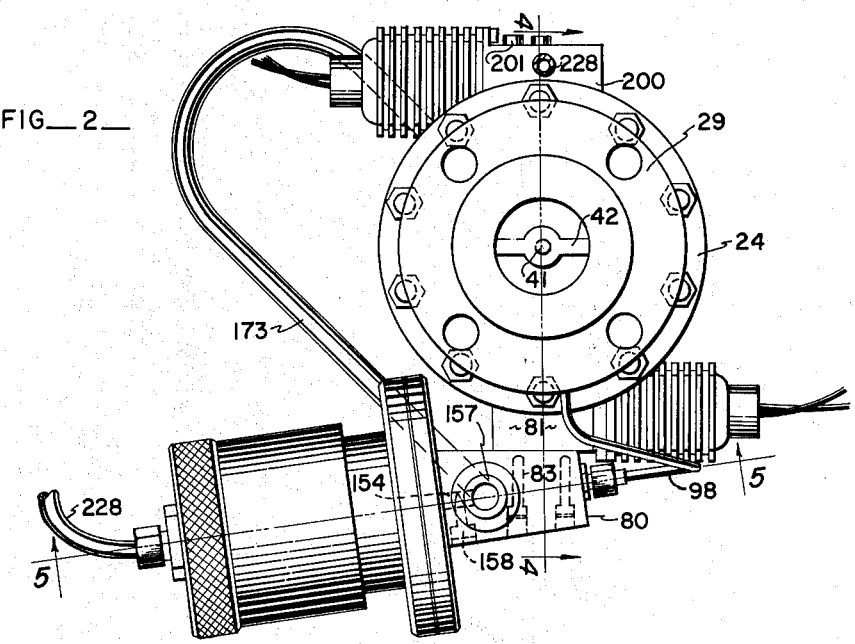
FIG_2_
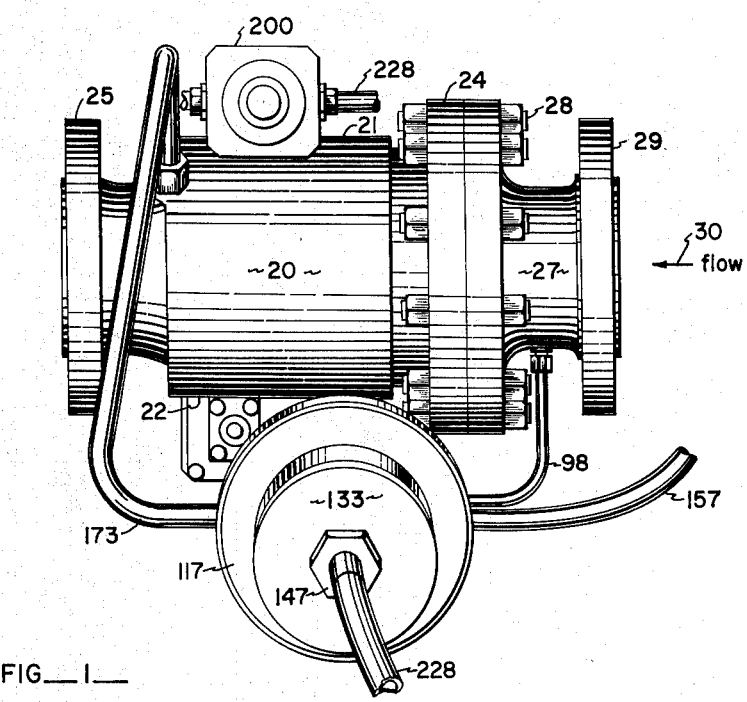
FIG_1_
INVENTORS
Robert L. Schaller
James Gerow
BY
D. Emmett Thompson
ATTORNEY

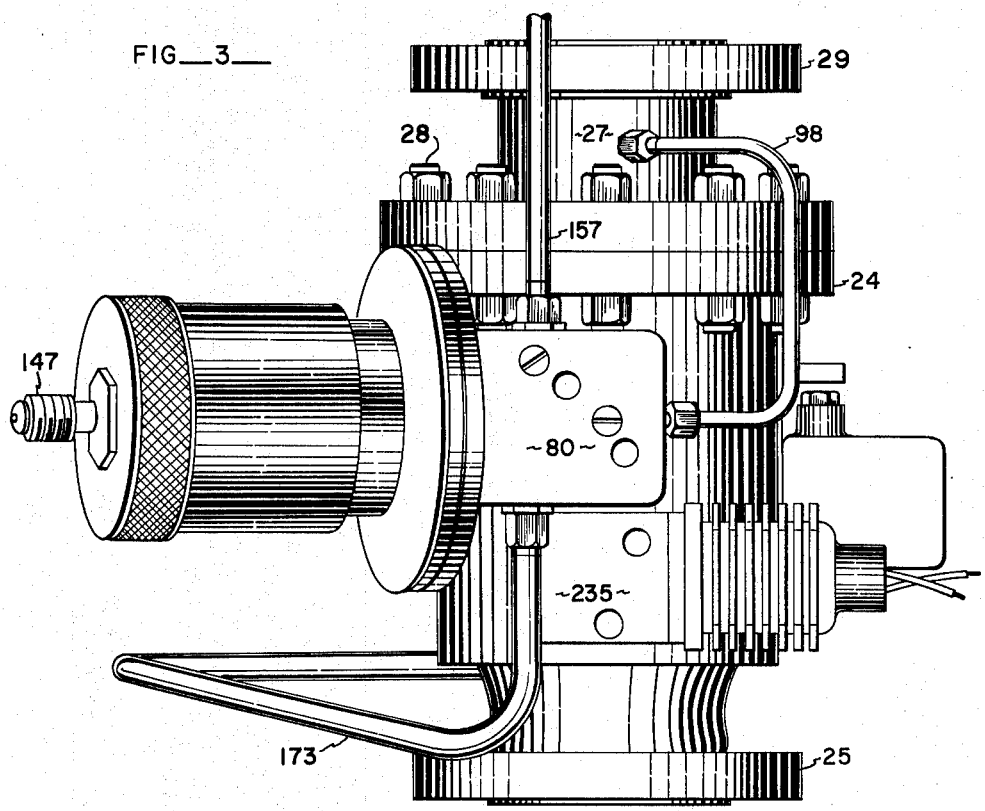
FIG_3_
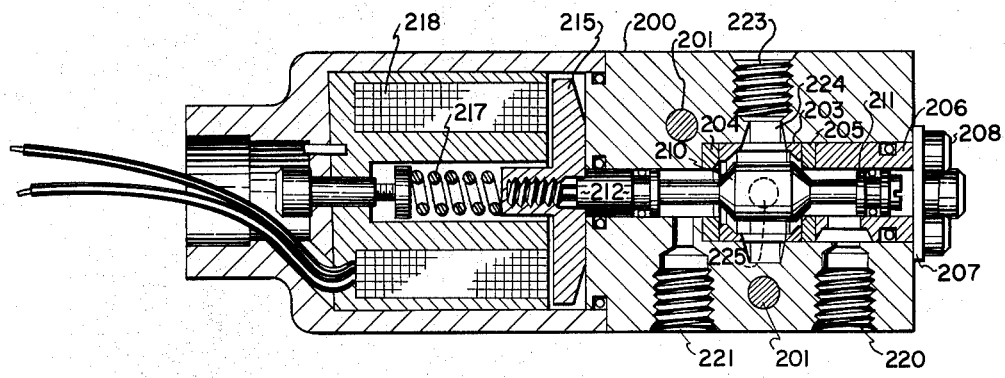
FIG_6_
INVENTOR.
Robert L. Schaller
James Gerow
BY
D. Emmett Thompson
ATTORNEY

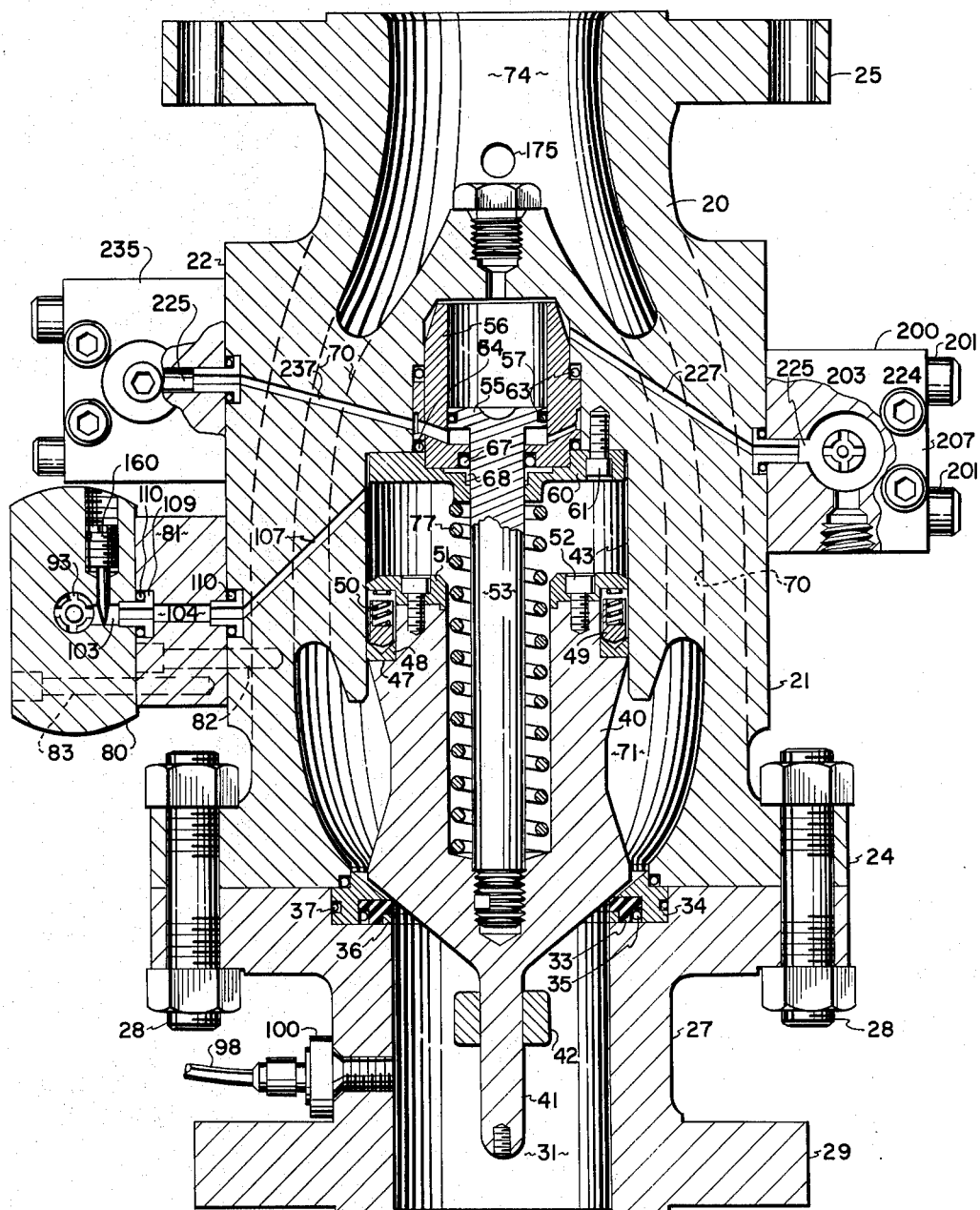
FIG_4_

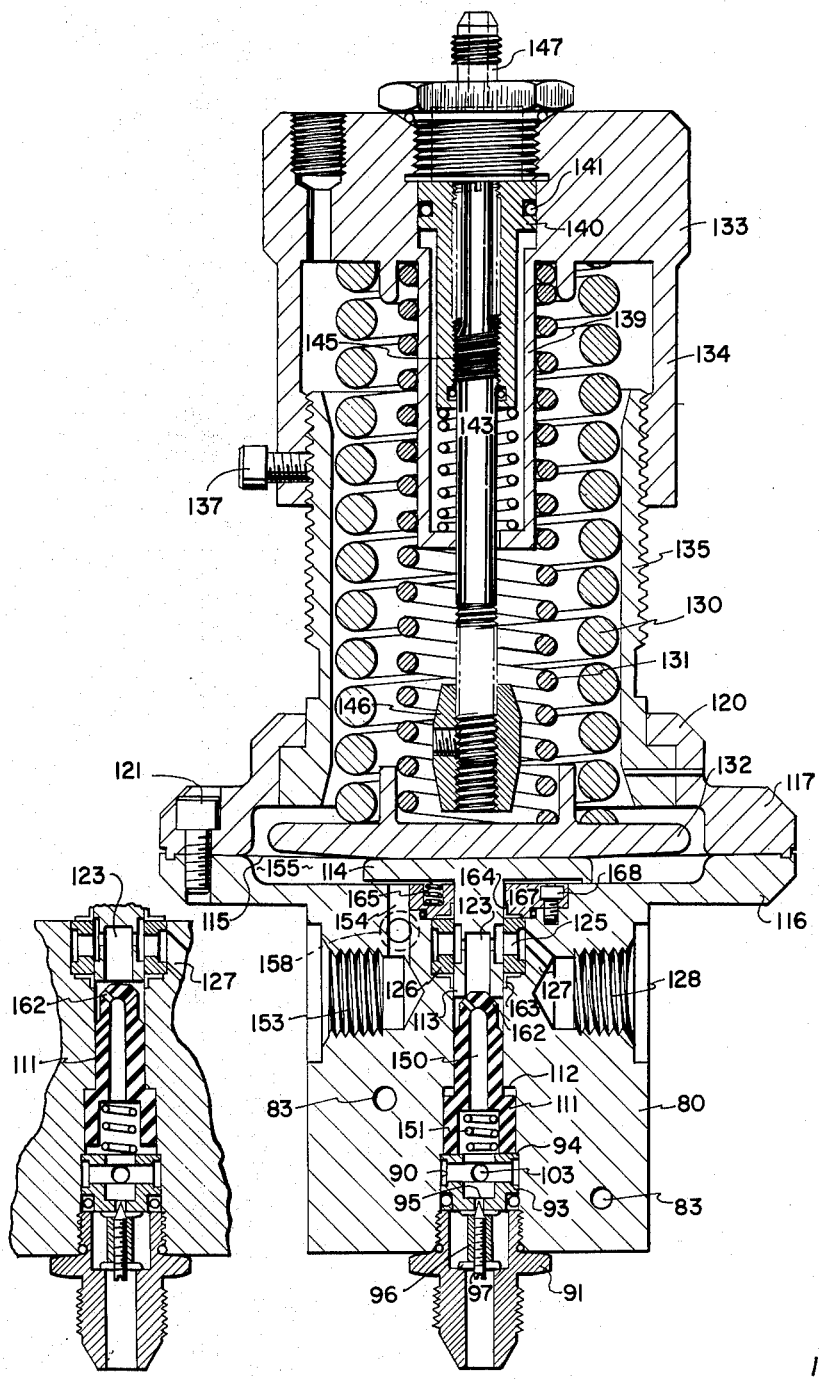

Robert L. Schaller, Marcellus, and James Gerow, Cleveland, N.Y., assignors to Engelberg, Inc., Syracuse, N.Y., a corporation of New York
Filed July 25, 1962, Ser. No. 212,200
1 Claim. (Cl. 137—220)

This invention has to do with a valve assembly intended particularly for use as a back pressure regulator valve to control, within very close limits, a predetermined desired pressure, as in a tank. One application of the invention is in connection with the operation of missiles, or rockets, in which exotic propellants are used and it is necessary to prevent even a relatively small increase in pressure above a predetermined value. In the event the predetermined pressure is exceeded, even to a very slight amount, the valve assembly functions in such manner as to immediately relieve the pressure and return it to the predetermined value and this, even in the event that the tank, or other receptacle to which the valve assembly is attached, is over-pressurized at a rate of several thousand pounds per square inch per second.

The invention has as an object a valve assembly which will open to relieve pressure applied to it when the applied pressure increases a small fraction of one percent of the desired predetermined pressure. The valve structure embodies an arrangement which functions to cause the valve to open upon a very slight increase in applied pressure and to re-close upon the applied pressure returning to the predetermined value. This, as distinguished from ordinary relief valves, or pop valves, wherein the valve is lifted from its seat by the pressure applied directly against the valve to move it from its seat against opposing spring pressure. Such conventional relief valves can be regulated to open at a predetermined applied static pressure. However, the velocity of flow of fluid through the open valve exerts additional pressure against the valve spring, causing the valve to overtravel, or otherwise remain open a period of time, after the applied static pressure in the tank, or receptacle to which the valve is attached, has fallen to the predetermined value, whereby such valves have a flow-off arrangement, which means the valve does not reseat until the static pressure in the tank has dropped an appreciable degree below the pressure at which it opened.

In the valve assembly of our invention, the valve poppet is moved out of engagement with its seat upon a very slight increase in tank pressure, and will immediately reseat when the tank pressure has returned to the predetermined value, all whereby our valve assembly functions to maintain the tank pressure within exceedingly close limits of the predetermined pressure value. For example, if the predetermined pressure value is 150 pounds per square inch, our valve structure will function to maintain this value within one pound per square inch and, in some tests, a pressure differential has been maintained no greater than one-half pound per square inch.

The invention consists generally of a poppet type valve, the inlet end of which is connected to a tank, or other vessel, in which it is desired to maintain a pressure of predetermined value. The poppet is urged into engagement with the seat by a low-rate spring. The upper or opposite end of the poppet from that engaging the seat has an area in excess of the seat area. The tank pressure is also applied to the cavity in the valve casing above the upper end of the poppet, whereby the tank pressure maintains the valve in closed position.

There is a pilot valve associated with the main relief valve and functions, upon a slight increase in the tank pressure above the predetermined value, to relieve the pressure on the top of the poppet in the main valve, whereby the tank pressure applied to the seat end of the poppet will then move the poppet upwardly, or out of engagement with the seat, to permit a discharge flow through the main valve to relieve the pressure in the tank.

The pilot valve is also of the poppet type. Engagement between the poppet and its seat is effected by spring pressure greatly in excess of the effective fluid pressure applied at the seat area. A diaphragm is employed to effect separation of the poppet and seat upon pressure applied to the diaphragm in opposition to the valve spring. There is an extremely high ratio between the valve seat diameter and the diameter of the diaphragm, whereby the effective diaphragm area is extremely high compared to the poppet seat area. Because of this extremely high ratio of these areas, it is possible to have the cracking pressure of the unit practically equal to the re-seat pressure.

The tank pressure is applied to the diaphragm area and the pressure in the cavity above the poppet of the main valve is applied to the poppet seat area of the pilot valve. With this arrangement, a slight increase in tank pressure above the predetermined value applied against the diaphragm will effect separation of the pilot poppet and its seat to permit the escape of fluid in the cavity above the poppet in the main valve, permitting it to unseat and relieve the pressure in the tank.

The poppet of the main valve is connected to a cylinder and piston structure, and solenoid operated valves are provided for applying sufficient fluid pressure to either close or open the poppet entirely independently of the tank pressure. This, to provide for operation of the main pressure regulating valve from a remote point independent of tank pressure.

The invention consists in the novel features and in the combinations and constructions hereinafter set forth and claimed.

In describing this invention, reference is had to the accompanying drawings in which like characters designate corresponding parts in all the views.

Referring to the drawings:

FIGURE 1 is a side elevational view of the back pressure regulator valve assembly embodying our invention.

FIGURE 2 is an end elevational view looking to the left in FIGURE 1.

FIGURE 3 is a side elevational view looking upwardly in FIGURES 1 and 2.

FIGURE 4 is a vertical sectional view through the main valve taken on a line corresponding to line 4—4, FIGURE 2.

FIGURE 5 is a lengthwise sectional view through the pilot valve taken on line 5—5, FIGURE 2.

FIGURE 6 is a lengthwise sectional view through one of the solenoid control valves.

FIGURE 7 is a view of the poppet and seat structure shown in FIGURE 5, with the valve in open position.

The main valve consists of a cylindrical housing or casing 20 formed on opposite sides with pads to provide flat surfaces 21, 22, to which the pilot valve and solenoid control valves are mounted, as will be hereinafter explained. The casing 20 is formed at one end with a cylindrical flange 24, and at its opposite end with a similar flange 25.

A coupling collar 27 is attached to the flange 24, as by studs 28. The coupling 27 is formed at its opposite end with a circular flange 29 for attachment or connection with a tank, or other pressurized vessel. Accordingly, the flow through the valve, when open, is to the left in FIGURE 1, as indicated by the arrow 30, downwardly in FIGURE 3, and upwardly in FIGURE 4.

The connecting collar 27 is formed with an axially extending bore 31, see FIGURE 4, the end of which, confronting the valve casing 20, is recessed to receive an annular seat 33 held in position by a ring retainer 34. The seat 33 is formed with a groove in its periphery to receive an O-ring 35, and the seat is also provided with an inner reinforcing ring 36. The retaining ring 34 is also formed with a groove in its periphery to receive an O-ring 37. The ring 34 is held in position by having its marginal peripheral area clamped between the end of the casing 20 and the connecting collar 27.

The valve poppet 40 is formed with a guide stem 41 slidably mounted in an aperture formed in a spider 42 formed integrally with the collar 27. The central portion of the valve casing 20 is formed with a cylindrical cavity 43 in which the upper end portion of the poppet 40 is slidably mounted. The upper end portion of the poppet is of reduced diameter providing an annular shoulder 47 on which there is mounted an annular packing seal 48, the upper surface of which is formed with a circular V-shaped groove to provide an expansible lip seal. A ring 49 is positioned above the lip seal 48 and is urged downwardly into engagement with the lip seal by helical compression springs 50 acting against the ring 49 and against an annular plate 51 secured to the upper end of the poppet 40, as by screws 52. This arrangement prevents any escape of fluid from the cavity above the poppet.

A stem 53 is threadedly attached at its lower end to the poppet 40, and extends upwardly through the cavity 43 and is formed at its upper end with a piston 55, which is slidably mounted in a cylinder 56 mounted in a bore formed in the upper portion of the valve casing 20. The piston 55 is provided with an O-ring 57 for sealing engagement with the bore of the cylinder 56. The cylinder is secured in the bore of the casing by a circular plate 60 attached to the valve casing by screws 61. The cylinder 56 is effectively sealed in the casing by O-rings 63, 64, and the stem 53 is sealed by O-ring 67 and lip seal 68.

The housing 20 is formed with passages 70 connecting the chamber area 71 above the seat 33 with the upper axial discharge passage 74 in the casing.

The diameter of the cavity 43 above the poppet 40 is greater than the diameter of the seat 33 contacted by the poppet 40. The poppet is yieldingly urged downwardly into engagement with the seat 33 by a compression spring 77 encircling the stem 53. The spring 77 is a low rate spring and functions only to overcome friction between the sliding contacting areas of the poppet and housing to move the poppet into engagement with the seat in the absence of any applied pressure.

The fluid pressure applied to the inlet passage 31 of the main valve is conducted to the cavity 43 above the main poppet 40. Accordingly, due to the fact that the area at the top of the poppet in the cavity 43 is greater than the diameter of the seat 33, a greater force is applied to the poppet urging it downwardly into seating engagement.

In the event the applied pressure rises to exceed the predetermined value, fluid is released from the cavity 43 to reduce the pressure on the top of the poppet, permitting the excessive applied pressure to move the poppet upwardly out of engagement with the seat 33 for the passage of fluid into the chamber 71, upwardly through the passages 70, through the discharge or outlet end 74 of the main valve.

The pressure in the cavity 43 is controlled by a pilot valve, which is preferably fixedly secured directly to the main valve housing 20 in order to effect a more compact, serviceable and unitary assembly. In the arrangement shown, the fluid from the reservoir, tank, or other receptacle to which the valve assembly is connected, is conducted to the cavity 43 by passing through the base structure of the pilot control valve. This again, to render the assembly in more compact form.

The structural arrangement of the pilot control valve is best shown in the vertical sectional view, FIGURE 5 of the drawings. This valve consists of a base 80 positioned on a spacer block 81 attached to the main valve casing 20, as by screws 82, the base 80 of the pilot valve being attached to the spacer block, as by screws 83, see left-hand portion of FIGURE 4.

The base 80 of the pilot valve is formed with an axially disposed bore 90 extending inwardly, or upwardly, from the end of the base. The outer portion of the bore 90 is threaded to receive a tube connector 91. When the connector 91 is threaded home, the inner end of the connector engages a cage 93 positioned in the bore and abutting against a shoulder 94. The lower end wall of this cage is formed with a small aperture 95. There is a spider 96 mounted in the connector 91 and is threaded to receive a flow adjusting screw 97, the inner tapered end of which extends into the aperture 95.

The connector 91 is connected by a tube 98, see FIGURES 1 and 2. The opposite end of the tube 98, see FIGURE 4, extends to a connector 100 having communication with the inlet passage 31 of the main valve. Accordingly, the pressure in the tank is applied to the orifice 95. The base 80 of the pilot valve is also formed with a passage 103 extending laterally from the cage 93 and is arranged in alignment with a passage 104 extending through the spacer block 81 and communicating with a passage 107 extending to the upper end of the cavity 43. Fittings 109 are employed between the spacer block 81 and the valve casing 20 and the base 80 of the pilot valve, and O-rings 110 are employed to effectively seal these connections.

A poppet 111 is mounted above the cage and is free to move upwardly until it engages a shoulder 112 formed by a reduction in the diameter of the bore, see FIGURE 5. A seat 113 is slidably mounted in the bore above the poppet 111, the seat depending from a circular plate 114 positioned on the under side of a flexible diaphragm 115, the marginal portion of which is securely clamped between a flange 116 formed on the base 80 and a comparable flange 117 formed on a securing collar 120, the flanges 116, 117, being secured together by a series of screws 121.

The seat 113 is formed with an upwardly extending axial bore 123, the upper end of the bore having lateral passages which register with similar passages 125 formed in a cage 126 and connect with a passage 127 extending to a vent port 128 formed in the base 80. The diaphragm 115 is urged downwardly by helical compression springs 130, 131, which act against a disk 132, and at their upper ends against a cap 133 having a cylindrical flange 134 threaded onto a sleeve 135 secured to the base 80 by the collar 120. By threading the cap nut 133 on the sleeve 135, the tension of the springs 130, 131, may be varied. The cap is locked in adjusted position by a set screw 137. The cap 133 is also formed with a cylindrical portion 139 extending downwardly within the inner spring 131. A piston 140 is slidably mounted in the cap 133 and slidably sealed by O-ring 141. A stem 143 is threadedly connected to the piston 140, as at 145, the stem depending downwardly and has threadedly secured to its lower end a block 146. With this arrangement, when pressure is admitted on the top of the piston through the tube connector 147, the stem 143 is moved downwardly, moving the block 146 against the disk 132 to move the diaphragm 115 and the plate 114 downwardly to move the seat 113 in seating engagement with the poppet 111. The purpose of this piston structure will be referred to hereinafter.

The poppet 111 is formed with an axially extending passage 150, in the lower end of which is a compression spring 151 acting between the cage 93 and the poppet to urge the poppet upwardly into seating engagement with the seat 113.

The base 80 is also provided with a sensing port 153 which is connected by a passage 154 to the cavity or chamber 155 below the diaphragm 115. This sensing port 153 is connected by a tube 157, which preferably extends to the tank, or reservoir, the pressure of which is being controlled by the assembly. This pressure could also be supplied from the tube 98. However, closer regulation can be obtained by extending the sensing tube 157 to the tank where the pressure is static, which is not the case in the inlet passage 31 of the main valve when the poppet 40 is raised off from the seat 33, permitting the flow of fluid through the valve. The base 80 is also formed with a passage extending transversely of the passage 154 and in communication therewith. There is a flow regulating screw 158 threaded in this passage, and serves to adjust the flow of fluid through the passage 154.

A flow regulating screw 160, similar to the screw 158, is threaded into the base 80 of the pilot valve and extends into the passage 103. Adjustment of this screw controls the volume flow through the passage 103, that is, to and from the upper area of the cavity 43 in the main valve casing.

The operation of the valve assembly described is as follows: The pressure of the tank or reservoir to be controlled is applied to the inlet passage 31 of the collar 27. This pressure is also transmitted through the tube 98 to the fitting 91 in the base 80 of the pilot control valve and flows through the orifice 95 to the cage 93 and thence through the passages 103, 104, 107, to the upper portion of the cavity 43. Pressure is accordingly built up in the cavity 43 and due to the fact that the top of the poppet 40 in the cavity 43 has a greater area than that of the valve seat 33, the poppet is held against the seat and, in the absence of any control to modulate the pressure in cavity 43, the poppet 40 would remain seated regardless of the pressure in the tank.

Accordingly, static tank pressure is sensed against the under side of the diaphragm and on the top of the main poppet 40. Upon increase in the tank pressure above a predetermined value, the diaphragm 115 will be moved forwardly against the springs 130, 131. The poppet 111 will follow the movement of the seat 113 until the poppet engages the shoulder 112 in the valve base 80. Upon the poppet striking the shoulder 112, a leak across the seating diameter of the poppet 111 will be experienced. Fluid will flow upwardly from the cage cavity 93 through the passage 150, and outwardly through the passages 162 formed in the top portion of the poppet 111 below the area contacted by the seat 113. With the seat moved slightly upwardly from the top of the poppet 111, this flow will continue through the axial seat passage 123 through the passages 125, 127, to the vent port 128. Leakage of this flow about the periphery of the seat 113 is prevented by the lip seal 163. Leakage of the pressure from the cavity 155 under the diaphragm 115 is prevented by the lip seal 164. Upon slight further increase in tank pressure, the diaphragm will continue to move forward and with it the seat 113, and a greater flow will be experienced across the seating area of the poppet 11. With this greater flow of fluid through the poppet, the seat passage 123, and outwardly through the exhaust port 128, there will accordingly be a greater pressure drop in the cage 93. This drop results from the fact that the needle valve screw 97 is so adjusted in the orifice 95, that the flow through the tube 98, from the inlet 31 of the main valve, through the orifice 95, is relatively slight compared to the flow through the poppet 111 to the vent port 128. If the flow through the orifice 95 is extremely small, then with a relatively slight flow across the poppet seat and out through the vent port 128, will result in a rapid decrease in pressure in the cage 93 and accordingly, in back of the main poppet 40. The needle screw 97 serves as a trimming device and is of importance since a great many of the specifications for the use of this valve assembly call for the valve to operate under varying conditions of pressurization per second in the tank. The magnitude of these pressurizations can be as small as five pounds per square inch per second, to as large as 2500 pounds per square inch per second. The valve assembly is capable of operating over such range of pressurizations by adjustment of the needle valve screw 97.

Once the pressure decay is experienced on the top of the main poppet 40, it will gradually begin to open. At the beginning of this operation, the main poppet will move only a slight distance off from its seat 33, permitting a small flow into the chamber 71 and out the discharge passage 74. If, however, the tank pressure increases slightly more, indicating that the flow through the main poppet valve is not keeping up with the over-pressurization of the tank, there will be a further slight raise of pressure against the diaphragm 115, effecting more flow across the small poppet seat, thereby generating a greater pressure drop in the cage 93 and the cavity 43. Upon this greater decay of pressure in the cavity 43, the main poppet will open further to allow a greater flow. This operation will continue with the main poppet 40 opening to a greater extent until the tank pressure does not further increase.

The extent to which the main poppet 40 moves from its seat depends upon the rate of over-pressurization of the tank. As the tank pressure starts to drop, so the pressure in the diaphragm area 155 decreases, effecting movement of the seat 113 by the springs 130, 131, toward the poppet 111 decreasing the flow from the cage 93, through the vent port 128. As the tank pressure drops to the predetermined value, the poppet 40 has moved into close adjacency with the seat 33, and the seat 113 has moved into close adjacency with the poppet 111. Accordingly, the differential across the orifice 95 decreases—that is, the flow through the orifice 95 will become in excess of the flow between the poppet 111 and the seat 113, whereby the pressure in the cavity 43 gradually increases on the poppet 40 to gradually close the main poppet 40 against the flow and, as the seat 113 seals against the poppet 111, the pressure in the cavity 43 in back of the main poppet will, within a very short period of time, be equal to the pressure in the inlet 31, and the poppet 40 will firmly seat against the seat 33 and no more flow will be experienced through the main valve.

The time rate of the operation of the assembly, under various over-pressurization values, is determined by the setting of the flow control needle valves 97, 158, 160. By adjustment of these three screws, the time response ratio between the main poppet valve and the pilot valve can be varied to make the valve assembly operable within very close limits over widely varying conditions. The purpose of the flow control valve 158 is to further control the rate of flow into and out of the diaphragm cavity 155. By adjusting this flow, the timing of the operation of the pilot valve can be varied, and by adjusting the flow regulator 160, the flow into and out of the cavity 43 of the main valve can be varied and accordingly, the response time of the poppet in opening and closing.

The arrangement of the small poppet 111 in the pilot valve, and the movable seat 113, is known as an inverted type poppet valve. It is advantageous in this valve assembly in that there is very little, if any, "weeping" as the pressure in the tank approaches the cracking pressure of the main valve. The reason for this is that the higher the pressure established through the orifice 95, the greater the sealing force between the poppet and the seat, and this sealing force is maintained until the poppet, upon upward movement together with the seat, strikes the shoulder 112. This gives an extremely accurate cracking pressure and, by the same token, an accurate reset pressure for the valve assembly.

As the tank pressure decreases toward the predetermined value, there will be a like decrease in pressure under the diaphragm 115 and accordingly, the seat 113 will be moved toward the poppet, reducing the flow from the cage 93.

The exhaust or vent port 128 is connected to a port 175 communicating with the discharge passage 74 of the main valve casing 20 by a tube 173.

The valve assembly may include an arrangement to permit the main poppet 40 to be manually opened and closed at a place remote from the valve assembly and independent of the pilot valve. A solenoid valve 200 is attached to the main valve casing 20, as by screws 201. The structure of this valve is shown in the lengthwise sectional view, FIGURE 6. It is a solenoid operated valve of conventional construction. The valve body is formed with a bore extending inwardly from one end thereof. In the inner portion of the bore, there is positioned a cage 203 interposed between annular seats 204, 205. The seat 205 is engaged by a sleeve 206 pressed against the seat by a plate 207 secured to the valve body, as by screws 208. A poppet 210 is positioned in the cage 203 and has axially extending stems, one of which is formed with a piston 211 slidable in the sleeve 206, and the other with a piston 212 slidable in a continuation of the bore in the body. The piston portion 212 of the poppet stem has a threaded connection with an armature 215 and the poppet is urged to the right in engagement with the seat 205 by helical compression spring 217. A solenoid coil 218, when energized, attracts the armature 215 to move the poppet 210 to the left in engagement with seat 204. The valve body is formed with an inlet port 220 connected to a source of fluid under pressure, and with an exhaust port 221. The inlet port 220 is positioned on the side of the seat 205 opposite to that engaged by the poppet, and the exhaust port 221 is arranged on the opposite side of the seat 204 to that engaged by the poppet. A port 223 communicates with an annular chamber 224 surrounding the cage 203—that is, with the area between the seats 204, 205. There is also another port 225 extending from the chamber 224 to a passageway 227 through the main valve casing 20 and communicating with the upper area of the cylinder 56, see FIGURE 4. The port 223 is connected by a tube 228 to the fitting 147 on the outer end of the pilot valve for conveying pressure above the piston 140 thereof. When the solenoid 218 is energized, the poppet is shifted to the left into engagement with the seat 204 and out of engagement with the seat 205, permitting a flow from the inlet port 220 to the cage chamber 224 outwardly through the port 225, through the passageway 227, to the top of cylinder 56 to force the poppet 40 against its seat 33. This pressure is also applied through the tube 228 on the upper surface of the piston 140 of the pilot control valve, moving the diaphragm downwardly, and the seat 113 against the poppet 111. Accordingly, upon energization of the solenoid valve 200, the main poppet 40 is forced closed, and in like manner, the pilot valve is forced closed. When the solenoid 218 is de-energized spring 217 moves the poppet 210 to the right against the seat 205 and out of engagement with the seat 204. Thus, the flow is stopped from inlet port 220 to the ports 223, 225, and these ports are connected to the exhaust port 221.

There is a second solenoid operated valve 235 attached to the main valve casing, see FIGURE 4. The valve 235 embodies the same structure as valve 200. It has its port 225 communicating with a passageway 237 extending to the bottom of the cylinder 56. The port 223 of this valve 235 is not employed. Upon energization of the valve 235, pressure from it to the inlet port 220 of the valve is applied to the cylinder 56 below the piston 55 for forcibly raising the poppet 40 from the seat 33.

The solenoid valves 200, 235, may be energized at a place remote from the pressure regulator valve assembly to force open, or force close, the main poppet valve, independent of tank pressure on the pilot valve.

What we claim is:

A back pressure regulator valve assembly for maintaining a uniform pressure in a tank or the like, said assembly comprising a main valve casing having a inlet passage at one end for connection to a tank and an outlet passage at the opposite end, an annular seat mounted in said inlet passage, said casing being formed with a chamber above said seat and having a discharge passage communicating with said outlet passage, said casing being formed intermediate said chamber and said outlet passage with a cylindrical cavity extending upwardly from said chamber, a poppet having a cylindrical portion slidably mounted in said cylindrical cavity, said poppet being movable axially into and out of engagement with said seat, the diameter of the cylindrical portion of said poppet being greater than the diameter of said seat, means connecting the upper portion of said cylindrical cavity to the pressure applied to the inlet of said casing, whereby to force said poppet into engagement with said seat against the pressure applied through said inlet passage against said poppet, an inverted poppet type pilot valve connected to said main valve for controlling the pressure in said cylindrical cavity of said main valve above the cylindrical portion of said poppet, said pilot valve comprising a body having a bore in one end, a poppet mounted in said bore, a seat slidably mounted in said bore above said poppet for movement in a direction axially of the poppet into and out of seating engagement therewith, said poppet being formed with a passage extending upwardly from said bore and laterally through the poppet below the seat contacting area thereof, said body being also formed with a diaphragm chamber above said seat, a diaphragm closing the top of said chamber, said seat having engagement with said diaphragm, spring means exerting a predetermined pressure against said diaphragm downwardly to move said seat into engagement with the upper end of said poppet to prevent the escape of fluid from said bore through the passage in said poppet, said bore being connected to the cavity above the poppet in said main valve casing, means for applying fluid under static pressure from the tank to said diaphragm chamber whereby, when said fluid reaches a predetermined pressure, said diaphragm and valve seat are moved upwardly effecting separation of said seat and poppet, said seat being formed with an axial passage extending upwardly from the poppet contacting end thereof and communicating with a discharge passage formed in the body of said pilot valve to permit discharge of fluid from the cavity above the poppet in said main valve casing.

References Cited by the Examiner

UNITED STATES PATENTS

| | | | |
|---|---|---|---|
| 442,492 | 12/1890 | Ord | 251—43 XR |
| 703,687 | 7/1902 | Warren | 137—489 |
| 1,987,819 | 1/1935 | Foulds | 137—220 XR |
| 2,162,779 | 6/1939 | Leutwiler | 137—495 |
| 2,906,289 | 9/1959 | Fox | 137—508 |

FOREIGN PATENTS 723,307 8/1942 Germany.

M. CARY NELSON, *Primary Examiner.*

ISADOR WEIL, *Examiner.*